United States Patent
Muenchausen et al.

(10) Patent No.: US 7,834,319 B2
(45) Date of Patent: Nov. 16, 2010

(54) NANOPHOSPHOR COMPOSITE SCINTILLATORS COMPRISING A POLYMER MATRIX

(75) Inventors: Ross Edward Muenchausen, Los Alamos, NM (US); Edward Allen Mckigney, Los Alamos, NM (US); Robert David Gilbertson, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 477 days.

(21) Appl. No.: 11/923,934

(22) Filed: Oct. 25, 2007

(65) Prior Publication Data

US 2009/0302195 A1 Dec. 10, 2009

Related U.S. Application Data

(63) Continuation-in-part of application No. 11/729,073, filed on Mar. 27, 2007, now Pat. No. 7,547,888, which is a continuation-in-part of application No. 11/644,246, filed on Dec. 21, 2006, now Pat. No. 7,525,094.

(60) Provisional application No. 60/786,581, filed on Mar. 27, 2006, provisional application No. 60/752,981, filed on Dec. 21, 2005.

(51) Int. Cl.
*G01T 1/20* (2006.01)
*C09K 11/02* (2006.01)

(52) U.S. Cl. ............................................. 250/361 R

(58) Field of Classification Search ............... 250/361 R
See application file for complete search history.

(56) References Cited

U.S. PATENT DOCUMENTS

| | | | | |
|---|---|---|---|---|
| 4,230,510 | A | * 10/1980 | Cusano et al. | ............... 156/67 |
| 6,565,973 | B2 | * 5/2003 | Duff et al. | ................... 428/402 |
| 7,145,149 | B2 | 12/2006 | Cooke et al. | |
| 2003/0011310 | A1 | 1/2003 | Juestel et al. | |
| 2006/0060823 | A1 | 3/2006 | Cooke et al. | |
| 2006/0086311 | A1 | 4/2006 | Zagumennyi et al. | |
| 2007/0034833 | A1 | 2/2007 | Parce et al. | |
| 2007/0098029 | A1 | 5/2007 | LeBoeuf et al. | |
| 2007/0104629 | A1 | 5/2007 | Yadav | |
| 2007/0116638 | A1 | 5/2007 | Petruska et al. | |
| 2007/0164223 | A1 | 7/2007 | Hennessy et al. | |

OTHER PUBLICATIONS

Patent Cooperation Treaty, Notification of Transmittal of the International Search Report and Written Opinion of the International Searching Authority, or the Declaration.

* cited by examiner

*Primary Examiner*—Constantine Hannaher
(74) *Attorney, Agent, or Firm*—Husch Blackwell, LLP

(57) ABSTRACT

An improved nanophosphor composite comprises surface modified nanophosphor particles in a solid matrix. The nanophosphor particle surface is modified with an organic ligand, or by covalently bonding a polymeric or polymeric precursor material. The surface modified nanophosphor particle is essentially charge neutral, thereby preventing agglomeration of the nanophosphor particles during formation of the composite material. The improved nanophosphor composite may be used in any conventional scintillator application, including in a radiation detector.

19 Claims, No Drawings

NANOPHOSPHOR COMPOSITE SCINTILLATORS COMPRISING A POLYMER MATRIX

CROSS-REFERENCE TO RELATED APPLICATIONS

This application is a continuation-in-part of U.S. patent application Ser. No. 11/729,073 filed Mar. 27, 2007 now U.S. Pat. No. 7,547,888 entitled "Nanocomposite Scintillator, Detector, and Method," which is a continuation-in-part of U.S. patent application Ser. No. 11/644,246 filed Dec. 21, 2006 now U.S. Pat. No. 7,525,094 entitled "Nanocomposite Scintillator, Detector, and Method," and claims the benefit of U.S. Provisional Patent Application Ser. No. 60/786,581 filed Mar. 27, 2006 entitled "Nanocomposite Scintillator, Detector and Method," and U.S. Provisional Patent Application Ser. No. 60/752,981 filed Dec. 21, 2005 entitled "Nanocomposite Scintillator and Detector," all hereby incorporated by reference.

STATEMENT REGARDING FEDERAL RIGHTS

This invention was made with government support under Contract No. DE-AC52-06NA25396 awarded by the U.S. Department of Energy. The government has certain rights in the invention.

BACKGROUND OF INVENTION

Phosphors are currently used in many important devices such as fluorescent lamps, lasers and crystal scintillators for radiation detectors, radiographic imaging and nuclear spectroscopy. An important property of any phosphor is its brightness, or quantum efficiency, which is the ratio of the number of photons emitted by the phosphor to the number of photons absorbed. Other important properties include the spectral region of maximum emission, optical absorption, emission decay time and density. Phosphors may be categorized as either intrinsic, where the luminescence is generated by the host material, or extrinsic, where impurities or dopants in the host material generate the luminescence.

In general, superior scintillators exhibit high quantum efficiency, good linearity of spectral emission with respect to incident energy, high density, fast decay time, minimal self-absorption, and high effective Z-number (the probability of photoelectric absorption is approximately proportional to $Z^5$.) Specific scintillator applications determine the choice of phosphor. For example, scintillators used for active and passive radiation detection require high density and brightness, whereas scintillators used for radiographic imaging also require fast decay time.

Pending U.S. patent application Ser. No. 11/644,246, which shares a common assignee with the instant application, discloses novel nanophosphor composite scintillators. The application notes that agglomeration of the nanophosphor particles may be caused by Van der Waals type or Coulomb type attraction between the particles, leading to non-uniform distribution of the nanophosphors. To prevent or minimize agglomeration, charge may be added or subtracted from the nanoparticle surface by adjusting the pH. Alternatively, surfactants may be added to the matrix to decrease agglomeration. However, neither of these approaches fully avoids agglomeration of the nanoparticles.

There is, therefore, a need for an improved method of producing nanophosphor scintillator composites that prevents agglomeration to produce uniform distributions of nanophosphor throughout the composite material.

SUMMARY OF THE INVENTION

An illustrative aspect of the present invention is a composition comprising a solid matrix and at least one surface modified nanophosphor particle. The surface modified nanophosphor is selected from the group consisting of yttrium oxide, yttrium tantalite, barium fluoride, cesium fluoride, bismuth germatate, zinc gallate, calcium magnesium pyrosilicate, calcium molybdate, calcium chlorovanadate, barium titanium pyrophosphate, a metal tungstate, a cerium doped nanophosphor, a bismuth doped nanophosphor, a lead doped nanophosphor, a thallium doped sodium iodide, a doped cesium iodide, a rare earth doped pyrosilicate, and a lanthanide halide. The nanophosphor particle surface is modified by capping with an organic ligand, or by covalently bonding a polymer, monomer, oligomer or crosslinkable molecule.

Another illustrative aspect of the present invention is a method of radiation detection comprising exposing a nanophosphor composite including surface modified nanophosphor particles to a radiation source, and detecting luminescence from the nanophosphor composite.

Yet another illustrative aspect of the present invention is a radiation detector comprising of a nanophosphor composite including surface modified nanophosphor particles and a photodetector optically coupled to the composite.

DETAILED DESCRIPTION

There are provided novel compositions comprising surface modified nanophosphor particles in a solid matrix to form a nanophosphor composites, a detector utilizing the novel composition, and a method for detecting radiation. The surface of the nanophosphor particles is modified to form a charge neutral shell around the particles, thereby preventing particle attraction or agglomeration. The nanophospher composite is prepared by using nanophosphors of fast, bright, dense scintillators. The brightness provides a detector with optimum light detection, and the high density provides the detector with stopping power for radiation emitters such as x-rays, gamma-rays, neutrons and protons. The nanophosphor composite preparation cost is inexpensive compared to the cost of preparing single crystals.

The nanophosphor composites may be prepared by mixing the nanophosphors with a matrix or binder such as a polymer or glass. Nanophosphors of the present invention are defined as a powder with particle sizes of no more than 100 nanometers. The matrix is usually substantially transparent to light emission from the nanophosphor.

Matrix materials may have an index of refraction that closely matches the index of refraction of the phosphor and is transparent to the wavelength of emission of the nanophosphor. Additionally, the matrix material may also be a scintillator, thereby providing light from the energy deposited into the matrix. Suitable matrix materials include polystyrene, polyvinyl toluene, polyacetic acid, anthracene and naphthalene.

Nanophosphors of the present invention may be intrinsic phosphors or extrinsic phosphors. Intrinsic phosphors are phosphors that do not include a dopant in order to produce luminescence. Extrinsic phosphors include a dopant to produce luminescence. Nonlimiting examples of intrinsic phosphors include yttrium oxide, yttrium tantalite, barium fluoride, cesium fluoride, bismuth germinate, zinc gallate, calcium magnesium pyrosilicate, calcium molybdate, calcium chlorovanadate, barium titanium pyrophosphate, metal tungstate and lanthanide halides. Non-limiting examples of extrinsic phosphors include cerium doped nanophosphors, bismuth doped nanophosphors, lead doped nanophosphors, thallium doped sodium iodide, doped cesium iodide and rare earth doped pyrosilicates. Illustrative, non-limiting examples of specific suitable phosphors are given below.

Metal tungstate may be lead tungstate, zinc tungstate, calcium tungstate, magnesium tungstate or cadmium tungstate.

Cerium doped nanophosphor may be a cerium doped oxyorthosilicate; a formula $LAX_3$:Ce wherein X is at least one halide; a cerium doped lanthanum halosilicate of a formula $LaSiO_3$:Ce wherein X is at least one halide; an alkaline earth fluoride of a formula $MF_2$:Ce wherein M is at least one alkaline earth metal selected from the group consisting of barium, calcium, strontium and magnesium; an alkaline earth sulfate of a formula $MSO_4$:Ce wherein M is at least one alkaline earth chosen from barium, calcium, and strontium; an alkaline earth thiogallate of a formula $MGa_2S_4$:Ce wherein M is at least one alkaline earth chosen from barium, calcium, strontium and magnesium; alkaline earth aluminates of a formula $LMAl_{10}O_{17}$:Ce and $CeLMAl_{11}O_{18}$:Ce wherein L, M are at least two alkaline earth metal chosen from barium, calcium, strontium and magnesium; alkaline earth pyrosilicates of a formula $L_2MSi_2O_7$:Ce wherein L, M are at least two alkaline earth chosen from calcium and magnesium; a cerium doped metal aluminum perovskite $MAlO_3$:Ce wherein M is at least one metal chosen from yttrium and lutetium; a cerium doped alkaline earth sulphide of formula MS:Ce wherein M is at least one alkaline earth chosen from strontium and magnesium; a cerium doped yttrium borate; a cerium doped yttrium aluminum borate; a cerium doped yttrium aluminum garnet; a cerium doped yttrium oxychloride; a cerium doped calcium silicate; a cerium doped calcium aluminum silicate, a cerium doped yttirum phosphate, a cerium doped calcium aluminate, a cerium doped calcium pyroaluminate, a cerium doped calcium phosphate, a cerium doped calcium pyrophosphate, or a cerium doped lanthanum phosphate.

Bismuth doped nanophosphors include a host lattice selected from the group consisting of an alkaline earth phosphate of a formula $LM_2(P)_4)_2$:Bi wherein M is at least one alkaline earth chosen from barium, calcium and strontium; a lanthanide metal oxide of a formula $M_2O_3$:Bi wherein M is at least one metal chosen from yttrium and lanthanum; a bismuth doped yttrium aluminum borate; a bismuth doped lanthanum oxychloride; a bismuth doped zinc oxide; a bismuth doped calcium oxide; a bismuth doped calcium titanium aluminate; a bismuth doped calcium sulphide; a bismuth doped strontium sulphate; or a bismuth doped gadolinium niobate.

Lead doped nanophosphor is selected from alkaline earth sulfates of formula $MSO_4$:Pb wherein M is at least one alkaline earth chosen from calcium and magnesium; alkaline earth borates of formula $MB_4O_7$:Pb and $MB_2O_4$:Pb wherein M is at least one alkaline earth chosen from calcium and strontium; an alkaline earth chloroborate of a formula $M_2B_5O_9Cl$:Pb wherein M is at least one alkaline earth chosen from barium, calcium and strontium; a lead doped barium oxyorthosilicate; a lead doped calcium oxide; a lead doped calcium sulfide; a lead doped zinc sulfide; a lead doped lanthanum oxide; a lead doped calcium silicate; a lead doped calcium tungstate; a lead doped barium oxyorthosilicate; a lead doped calcium chlorosilicate; a lead doped calcium phosphate; and a lead doped calcium thiogallate.

Doped cesium iodide is doped with Na or Tl.

Rare earth doped pyrosilicate comprises a rare earth dopant Ce, Sm, Tb, Tm, Eu, Yb or Pr.

The nanophosphate may be a host lattice lutetium oxyorthosilicate (LSO), gadolinium oxyorthosilicate (GSO), yttrium oxyorthosilicate (YSO) lutettium yttrium oxyorthosilicate (LYSO) gadolinium yrttrium oxyorthosilicate (GYSO) lutetium gadolinium oxyorthosilicate (LGSO) or lanthanum halide.

Lanthanide halide may be of the formula $LnX_3$, wherein X is at least one halide selected from fluoride, chloride, bromide and iodide.

The effective density of the novel composition scintillator may be adjusted by altering the amount of the nanophosphor used. Embodiments may include an amount of nanophosphor of about 65% by volume or less.

Nanophosphors used with the present invention typically have a particle size of substantially equal to or less than about 100 nm, preferably less than about 50 nm and more preferably substantially equal to or less than about 20 nm. In certain embodiments a particle size of less than about 10 nm, or even less than about 5 nm may be utilized. It is noted, for example, that nanopowder with a 5 nm particle size, and for 600 nm photon wavelengths, the optical attenuation length is approximately 20 cm. As is well known in the art, the attenuation length is the distance through which the incident light intensity will be reduced to 1/e or 37% of the initial value. The attenuation length takes into account both optical absorption and scattering losses. The closer the index of refraction between the phosphor and the liquid matrix, the larger the attenuation length. When the indices are exactly or substantially matched, attenuation from optical scattering will become negligible.

Nanoparticles with mean particle sizes below 10 nm may be prepared using a variety of chemical and physical methods that include, but are not limited to single source precursor, hydrothermal, spray pyrolysis or solution combustion methods. These methods are well known in the art.

Nanoparticles may also be prepared by slurry ball milling of bulk scintillator powder, wherein the scintillator powder is milled in a solvent, and then centrifuging or sedimentation is used to isolate the desired fraction of nanoparticles. Mechanical processing of microsized powder using a process known in the art as bead milling has also been shown to produce particles having size less than or equal to 20 nm.

The nanophosphor particles used in the present invention are surface modified to achieve proper nanophosphor dispersion in the matrix, by functionalizing the particles to provide a neutral surface. The surface modification is preferably accomplished by either capping the nanophosphor with an organic ligand, or a covalently bonding a polymeric material to the nanophosphor.

Organic ligands, or surfactant molecules, typically consist of a polar end, usually a carboxylic acid group and a nonpolar tail. Suitable organic ligands are limited only by their coordination ability through either covalent, hydrogen-bonding, coordination bonding, or electrostatic interactions. Coordination ligands may include compounds such as phosphates, phosphonates, phosphine oxides, carboxylic acids and amines. Electrostatic ligands include ammonium and phosphonium cations, and alkoxide anions. Covalent ligands include alkoxides and alkyl thiolates. Hydrogen bonding ligands include carboxylic acids, amines, amides, thiols and phosphates. Illustrative capping agents include oleic acid, lauric acid and tri-n-octyl phosphine oxide. The ligands essentially form a 'ligand shell' around the nanophosphor particle, isolating the charged surface.

Alternately, the nanophosphors are covalently bonded to a polymeric material or a polymeric material precursor such as a monomer, oligomer or crosslinkable molecule. The nanophosphors are surface treated to provide strongly bonded organofunctional groups that are capable of chemical interactions and/or polymerization with other polymers or with monomeric building blocks. The latter approach would allow copolymerization of the particles with monomers. Conventionally, when high surface area nanoparticles are added to a polymeric material, rapid buildup of viscosity is typically observed even in the presence of solvents. In the present invention, the monomers have low initial viscosity, and serve as reactive solvents, similar to gel casting technology. Many polymerization systems are feasible. For example, the particles can be surface treated with organo-alkoxysilanes having a variety of functional groups such as vinyl (terminal alkene), glycidyl (epoxy), amino, isocyanate, and carboxylic acid. The choice of functional group is primarily based on a broad range of polymeric materials that possess adjacent functional groups that can be chemically interacted with the surface modified groups, as is well known in the art.

To achieve proper dispersion of the surface modified nanophosphor in the matix, two approaches are preferred. In the first dispersing method, a preexisting polymer matrix is swelled with a suitable solvent. For example, a nonpolar solvent such as acetone or toluene can be used to dissolve polystyrene or a polar solvent such as water can be used to dissolve polyacetic acid. The surface modified nanophosphors are then added to the dissolved polymer. The surface modification causes the nanophosphor particles to repel each other and be attracted to the polymer strands, thereby improving dispersion, leading to a more uniform nanophosphor composite. A linear polymer, as opposed to a crosslinked polymer, is required for this method.

In a second dispersing method, the surface modified nanophosphors are added to the monomer to induce a polymerization reaction in the monomer mixture. This method may be carried out for all four conventional polymerization reactions, namely bulk, solution, suspension and emulsion.

Bulk polymerization has the advantage that it does not use solvent which must ultimately be removed to preserve optical transparency. However, scaling up bulk polymerization reactions are the most difficult since the heat removal from viscous liquids is inherently nonlinear, requiring a complicated reactor design. A diluent or solvent may be used to facilitate heat dissipation during the polymerization reaction.

In solution polymerization the monomer is soluble in the solvent, although the polymer formed from the monomer may or may not be soluble. For example, styrene and polystyrene are soluble in toluene. The advantage of solution polymerization over bulk polymerization is better heat control, while the disadvantage is the need to remove the diluent from the polymer. In the present invention, an appropriate surface modified nanophosphor can be dissolved or suspended in the solvent/monomer solution prior to polymerization. The solution polymerization process requires a distillation or other solvent removal step, and that can add an appreciable cost to the manufacturing process.

Suspension polymerization, used when the monomer is insoluble or only slightly soluble in water and the polymer is insoluble in water, is bulk polymerization carried out in suspended droplets. The monomer is mechanically dispersed in a water phase that becomes the heat transfer medium. Since the water is a continuous phase, the viscosity changes very little as the monomer converts to polymer, so the heat transfer is very efficient. The reaction inside the droplets is essentially bulk polymerization, but since the droplets are only 10 to 1000 micrometers in diameter, the rapid reaction rates can be tolerated without boiling the monomer. The advantages are improved reaction heat control, and removal of the diluent (solvent) is much easier than in solution polymerization.

Suspension polymerization usually requires the addition of small amounts of a stabilizer to hinder coalescence and break-up of droplets formed during polymerization. This property can be incorporated into the surface modified nanophosphor, since like solution polymerization, it is desirable to incorporate the nanophosphor into the monomer phase prior to polymerization. The size distribution of the initial emulsion droplets and the polymer beads that are formed is dependent upon the balance between droplet break-up and droplet coalescence. This in turn is controlled by the type and speed of agitator used, the volume fraction of the monomer phase, and the type and concentration of stabilizer and or surface modified nanophosphor used. If the polymer is soluble in the monomer, a gel is formed within the droplets at low conversion and ultimately to harder spheres as the conversion progresses. If the polymer is insoluble in the monomer solution, precipitation will occur within the droplets, which will result in the formation of opaque, often irregularly shaped particles.

Optional additions to the monomer phase may include UV stabilizers such as aromatic ketones and esters, heat stabilizers such as ethylene oxide derivatives and inorganic metal salts, molding lubricants and foaming agents such as porogens. Typical polymeric stabilizers used for oil-in-water suspension polymerization reactions are poly (vinyl alcohol)-co-(vinyl acetate) formed from the partial hydrolysis (80-90%) of polyvinyl acetate, poly (vinyl-pyrrolidone), salts of acrylic acid polymers, cellulose ethers and natural gums.

Ultrasonic waves may also be used to perform suspension polymerization of styrene monomer in the absence of both emulsifier/surfactant and polymerization initiator. The particles prepared by this method are confirmed to be polystyrene particles by FT-IR measurements. The particle size is expected to be several tens nanometers as confirmed through TEM observation and dynamic light scattering measurement.

The final polymerization approach, emulsion polymerization, is a complex, multi-phase reaction that can be used to produce nanosized polymer particles. In addition to the additives used for suspension polymerization, an emulsifier surfactant is added at a concentration that exceeds the critical micelle concentration (CMC). Because the monomer droplets, which are dispersed by agitation and stabilizers in an aqueous solution, act as reservoirs to supply monomer units to growing polymer particles in micelles, the resulting system exhibits two distributions: monomer droplets (approximately 10-200 micrometers) and polymer particles (approximately 10-100 nm).

Oxide nanophosphor (ONP)/polystyrene nanocomposite particles can be synthesized through miniemulsion polymerization by using sodium lauryl sulfate surfactant (SLS), hexadecane costabilizer in the presence of ONP coated with methacryloxy(propyl)trimethoxysilane. Core-shell or other interesting morphology composite particles may be obtained depending on the size of the ONP particles and the surfactant concentration employed. By adjusting these parameters, it is possible to control the size and morphology of the composite particles.

The nanophosphor composites may further include organic dyes having optical absorption overlap with the nanophosphor. Illustrative dyes include 2,5-diphenyloxazone (PPO), biphenyl, POPOP and p-quaterphenyl p-terphenyl.

The resulting nanophosphor composites can be sized and shaped for individual applications. The nanophosphor composites may be used in a method for detecting radiation by exposing the nanophosphor composite to a radiation source and detecting luminescence from the nanophosphor composite. The nanophosphor composites may also be used in a radiation detector including the nanophosphor composite and a photodetector optically coupled to the composite.

EXAMPLES

Example 1

100 g of 5 µm diameter nanopowder of $Lu_2SiO_5$ doped with 1 at. % Sm and 100 g of anthracene are dissolved in 250 ml of hexane and shaken at room temperature for 20 min. The resulting mixture is reduced to a viscous, transparent liquid by rotary evaporation of the hexane and then cast in a cylinder. The material is solidified by slow drying in a vacuum oven at 100° C. for 24 hrs to yield a solid transparent composite.

Example 2

250 g of 2 nm diameter nanopowder of $LaBr_3$ doped with 2 at. % Ce is capped with an oleic acid (OA) shell (approximate wt. 50 g) and dried to a transparent gel. The gel is spread into a sheet mold and heated to 220° C. within a vacuum impregnator. Molten anthracene (150 g) is drawn into the gel and the mass is cooled in vacuum for 20 min. The resulting transparent composite sheet is then removed from the mold.

Example 3

5 g of 8 nm diameter $CeF_3$ nanopowder/OA gel (80:20) was dispersed in 25 ml of chloroform by vigorous shaking for 30 min. The resulting dispersion was precipitated by addition of 25 ml of methanol and the mixture was centrifuged (30,000 rpm) for 15 min. After the solvent was decanted the nanopowder was redispersed in 25 ml of chloroform to which 5 g of benzoic acid had been dissolved.

Example 4

100 g of 8 nm dia. $CeF_3$ nanopowder/OA gel (80:20) is dispersed in 1 L of a toluene-shifter mixture by shaking for 20 min. The toluene mixture is prepared by stirring 1.5 g of p-terphenyl with 30 mg of 3-hydroxyflavone and stirring at room temperature for 30 min. To the nanopowder/toluene dispersion 100 g of finely ground atactic polystyrene is added and stirred for 1 hr to yield a viscous liquid. The excess toluene is removed by rotary evaporation and the resultant opaque solid is ground into a fine powder. The powder is charged into a nitrogen purged, single screw extruder at a barrel temperature of 245° C. and injected into a 90° C. heated mold (20 cm×20 cm×5 mm) in 2-5 seconds.

Example 5

7.5 g of 8 nm dia. $CeF_3$ nanopowder/OA gel (80:20) was dispersed in 25 ml of chloroform by vigorous shaking for 30 min. The resulting dispersion was precipitated by addition of 25 ml of methanol and the mixture was centrifuged (30,000 rpm) for 15 min. After the solvent was decanted the nanopowder was redispersed in 5 g of lauryl methacrylate. The liquid suspension was evacuated at room temperature for 15 min to remove traces of methanol. 1 g of methacrylic acid was added to the mixture, which was subsequently polymerized by addition of the AIBN initiator followed by heating at 60 degrees for 24 hours Example 6

Styrene and 1,4-divinylbenzene (50-60% solution in ethyl benzene) are destabilized and distilled. A three-necked flask, fitted with stirrer (preferably with revolution counter), thermometer, reflux condenser and nitrogen inlet, is evacuated and filled with nitrogen three times. 250 mg of polyvinyl alcohol are placed in the flask and dissolved in 150 mL of de-aerated water at 50° C. A freshly prepared solution of 0.25 g (1.03 mmol) dibenzoyl peroxide (a crosslinker) in 25 mL (0.22 mmol) styrene containing 10 g $CeF_3$ surface modified nanopowder and 2 mL (7 mmol) 1,4-divinylbenzene is slowly added with constant stirring so as to produce an emulsion of fine droplets of monomer in water. This reaction mixture is heated to 90° C. on a water bath while maintaining a constant rate of stirring and passing a gentle stream of nitrogen through the reaction vessel. After about 1 h (about 5% conversion) the cross-linking becomes noticeable (gelation). Stirring is continued for another 7 h at 90° C., after which the reaction mixture is allowed to cool to room temperature while stirring. The supernatant liquid is decanted from the beads, which are washed several times with methanol and finally stirred for another 2 h with 200 ml of methanol. The polymer is filtered off and dried overnight in vacuum at 50° C. Yield: practically quantitative.

Example 7

Styrene monomer containing dissolved $CeF_3$ surface modified nanopowder is ultrasonically dispersed as oil droplets at 40 kHz after being added dropwise into water. Polymerization of the monomer in the droplets is initiated with the radical species from water as the polymerization initiator generated by irradiation with a high frequency ultrasonic wave at 200 kHz on the surfactant-free (styrene monomer-modified nanophosphor/water) emulsion.

All percentages used herein are wt/wt percentages unless otherwise noted.

Having described the invention in detail, those skilled in the art will appreciate that modifications may be made of the invention without departing from its' spirit and scope. Therefore, it is not intended that the scope of the invention be limited to the specific embodiments described. Rather, it is intended that the appended claims and their equivalents determine the scope of the invention.

What is claimed is:

1. A nanophosphor composite scintillator composition comprising:
    a solid matrix; the solid matrix including
    at least one surface modified nanophosphor scintillator particle selected from the group consisting of yttrium oxide, yttrium tantalite, barium fluoride, cesium fluoride, bismuth germatate, zinc gallate, calcium magnesium pyrosilicate, calcium molybdate, calcium chlorovanadate, barium titanium pyrophosphate, a metal tungstate, a cerium doped nanophosphor, a bismuth doped nanophosphor, a lead doped nanophosphor, a thallium doped sodium iodide, a doped cesium iodide, a rare earth doped pyrosilicate, and a lanthanide halide;
    wherein the nanophosphor scintilltor particle is surface modified by functionalizing the particles to provide a neutral surface to achieve particle dispersion in the solid matrix.

2. The composition of claim 1 wherein the metal tungstate comprises lead tungstate, zinc tungstate, calcium tungstate, magnesium tungstate or cadmium tungstate.

3. The composition of claim 1 wherein said cerium doped nanophosphor is a cerium doped oxyorthosilicate of the formula $LAX_3$:Ce wherein X is at least one halide; a cerium doped lanthanum halosilicate of a formula $LaSiO_3$:Ce wherein X is at least one halide; an alkaline earth fluoride of a formula MF$_2$:Ce wherein M is at least one alkaline earth metal selected from the group consisting of barium, calcium, strontium and magnesium; an alkaline earth sulflate of a formula MSO$_4$:Ce wherein M is at least one alkaline earth chosen from barium, calcium, and strontium; an alkaline earth thiogallate of a formula MGa$_2$S$_4$:Ce wherein M is at least one alkaline earth chosen from barium, calcium, strontium and magnesium; alkaline earth aluminates of a formula LMAl$_{10}$O$_{17}$:Ce and CeLMAl$_{11}$O$_{18}$:Ce wherein L, M are at least two alkaline earth metal chosen from barium, calcium, strontium and magnesium; alkaline earth pyrosilicates of a formula L$_2$MSi2O$_7$:Ce wherein L, M are at least two alkaline earth chosen from calcium, and magnesium; a cerium doped metal aluminum perovskite MAlO$_3$:Ce wherein M is at least one metal chosen from yttrium and lutetium; a cerium doped alkaline earth sulphide of formula MS:Ce wherein M is at least one alkaline earth chosen from strontium and magnesium; a cerium doped yttrium borate; a cerium doped yttrium aluminum borate; a cerium doped yttrium aluminum garnet; a cerium doped yttrium oxychloride; a cerium doped calcium silicate; a cerium doped calcium aluminum silicate; a cerium dopedyttirum phosphate; a cerium doped calcium aluminate; a cerium doped calcium pyroaluminate; a cerium doped calcium phosphate; a cerium doped calcium pyrophosphate; or a cerium doped lanthanum phosphate.

4. The composition of claim 1 wherein the bismuth doped nanophosphor comprises a host lattice selected from the group consisting of an alkaline earth phosphate of a formula LM$_2$(P)$_4$)$_2$:Bi wherein M is at least one alkaline earth chosen from barium, calcium and strontium; a lanthanide metal oxide of a formula M$_2$O$_3$:Bi wherein M is at least one metal chosen from yttrium and lanthanum; a bismuth doped yttrium aluminum borate; a bismuth doped lanthanum oxychloride; a bismuth doped zinc oxide; a bismuth doped calcium oxide; a bismuth doped calcium titanium aluminate; a bismuth doped calcium sulphide; a bismuth doped strontium sulphate; or a bismuth doped gadolinium niobate.

5. The composition of claim 1 wherein the lead doped nanophosphor is chosen from alkaline earth sulfates of formula MSO$_4$:Pb wherein M is at least one alkaline earth chosen from calcium and magnesium; alkaline earth borates of formula MB$_4$O$_7$:Pb and MB$_2$O$_4$:Pb wherein M is at least one alkaline earth chosen from calcium and strontium; an alkaline earth chloroborate of a formula M$_2$B$_5$O$_9$Cl:Pb wherein M is at least one alkaline earth chosen from barium, calcium and strontium; a lead doped barium oxyorthosilicate; a lead doped calcium oxide; a leaddoped calcium sulfide; a lead doped zinc sulfide; a lead doped lanthanum oxide; a lead doped calcium silicate; a lead doped calcium tungstate; a lead doped barium oxyorthosilicate; a lead doped calcium chlorosilicate; a lead doped calcium phosphate; a lead doped calcium thiogallate.

6. The composition of claim 1 wherein the doped cesium iodide comprises a dopant selected from the group consisting of Na and Tl.

7. The composition of claim 1 wherein said rare earth doped pyrosilicate comprises a rare earth dopant chosen from Ce, Sm, Tb, Tm, Eu, Yb and Pr.

8. The composition of claim 1 wherein said nanopowder phosphor comprises a host lattice chosen from lutetium oxyorthosilicate (LSO), gadolinium oxyorthosilicate (GSO), yttrium oxyorthosilicate (YSO) lutetium yttrium oxyorthosilicate (LYSO) gadolinium yrttrium oxyorthosilicate (GYSO) lutetium gadolinium oxyorthosilicate (LGSO) and lanthanum halide.

9. The composition of claim 1 wherein the lanthanide halide is of a formula LnX$_3$ wherein X is at least one halide chosen from fluoride, chloride, bromide and iodide.

10. The composition of claim 1 wherein the solid matrix is selected from the group consisting of polystyrene, polyvinyl toluene, polyacetic acid, anthacene and naphthalene.

11. The composition of claim 1 wherein the surface modified nanophosphor comprises a nanophosphor capped with an organic ligand.

12. The composition of claim 11 wherein the organic ligand is selected from the group consisting of phosphates, phosphonates, phosphine oxides, carboxylic acids, amines, ammonium cations, phosphonium cations, alkoxide anions, alkoxides, alkyl thiolates, amides, and thiols.

13. The composition of claim 1 wherein the surface modified nanophosphor comprises a nanophosphor covalently bonded to a polymer, monomer, oligomer, or crosslinkable particle.

14. The composition of claim 13 wherein the polymer, monomer, oligomer or crosslinkable particle includes a functional group selected from the group consisting of a vinyl group, a glycidyl group, an amino group, an isocyanate group and a carboxylic acid group.

15. A radiation detection method comprising:
exposing a nanophosphor composite to a radiation source, the composite including:
a solid matrix; the solid matrix including
at least one surface modified nanophosphor particle selected from the group including: yttrium oxide, yttrium tantalite, barium fluoride, cesium fluoride, bismuth germatate, zinc gallate, calcium magnesium pyrosilicate, calcium molybdate, calcium chlorovanadate, barium titanium pyrophosphate, a metal tungstate, a cerium doped nanophosphor, a bismuth doped nanophosphor, a lead doped nanophosphor, a thallium doped sodium iodide, a doped cesium iodide, a rare earth doped pyrosilicate, and a lanthanide halide;
wherein the nanophosphor scintilltor particle is surface modified by functionalizing the particles to provide a neutral surface to achieve particle dispersion in the solid matrix; and
detecting luminescence from the scintillator composition.

16. The method of claim 15 wherein the surface modified nanophosphor comprises a nanophosphor capped with an organic ligand.

17. The method of claim 16 wherein the organic ligand is selected from the group consisting of phosphates, phosphonates, phosphine oxides, carboxylic acids, amines, ammonium cations, phosphonium cations, alkoxide anions, alkoxides, alkyl thiolates, amides, and thiols.

18. The method of claim 15 wherein the surface modified nanophosphor comprises a nanophosphor covalently bonded to a polymer, monomer, oligomer, or crosslinkable particle.

19. The method of claim 18 wherein the polymer, monomer, oligomer or crosslinkable particle includes a functional group selected from the group consisting of a vinyl group, a glycidyl group, an amino group, an isocyanate group and a carboxylic acid group.

* * * * *